Nov. 13, 1934.  H. H. EATON  1,980,170
INSULATION PROCESS AND MACHINE
Filed Oct. 22, 1928  5 Sheets-Sheet 2

Inventor
Harrison H. Eaton
By Braselton, Whitcomb & Davies
Attorneys

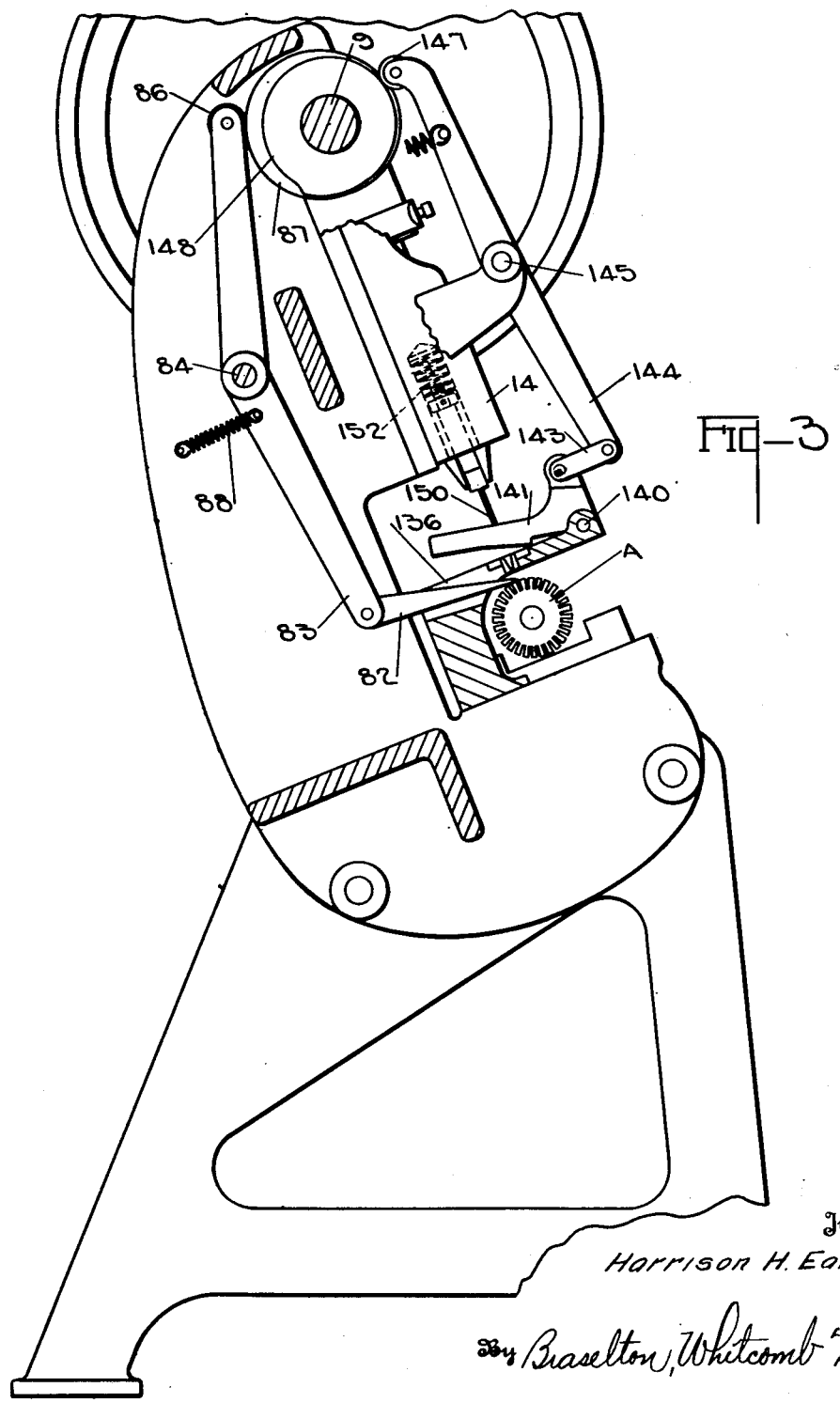

Nov. 13, 1934.  H. H. EATON  1,980,170
INSULATION PROCESS AND MACHINE
Filed Oct. 22, 1928  5 Sheets-Sheet 4
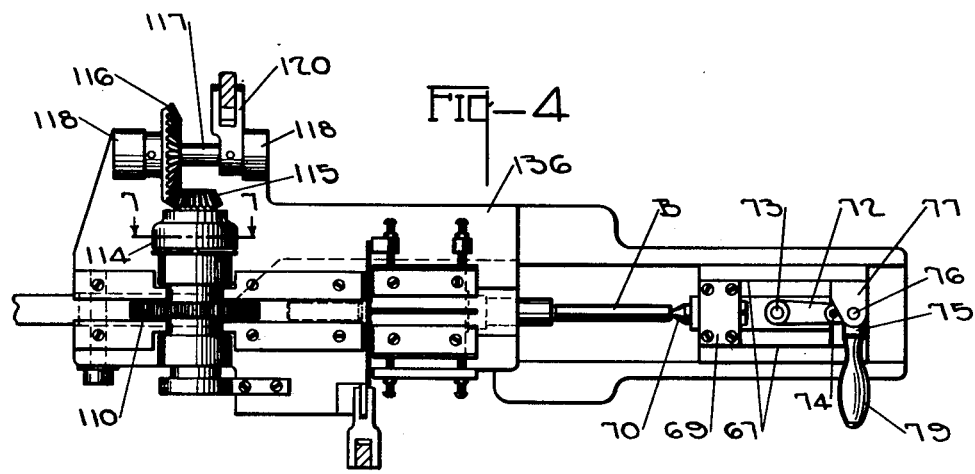
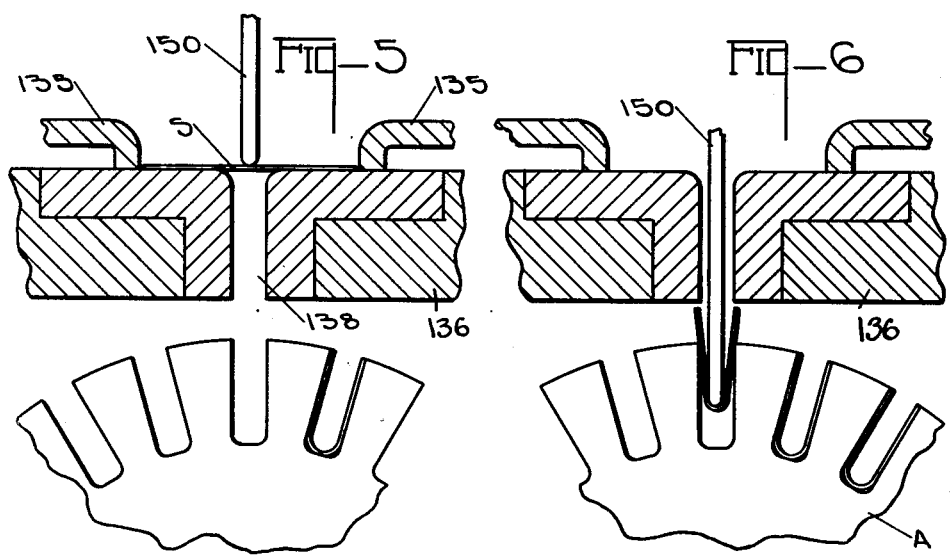
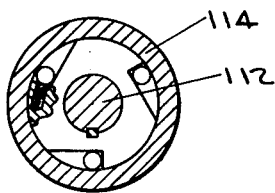
Inventor
Harrison H. Eaton
By Braselton, Whitcomb & Davis
Attorneys

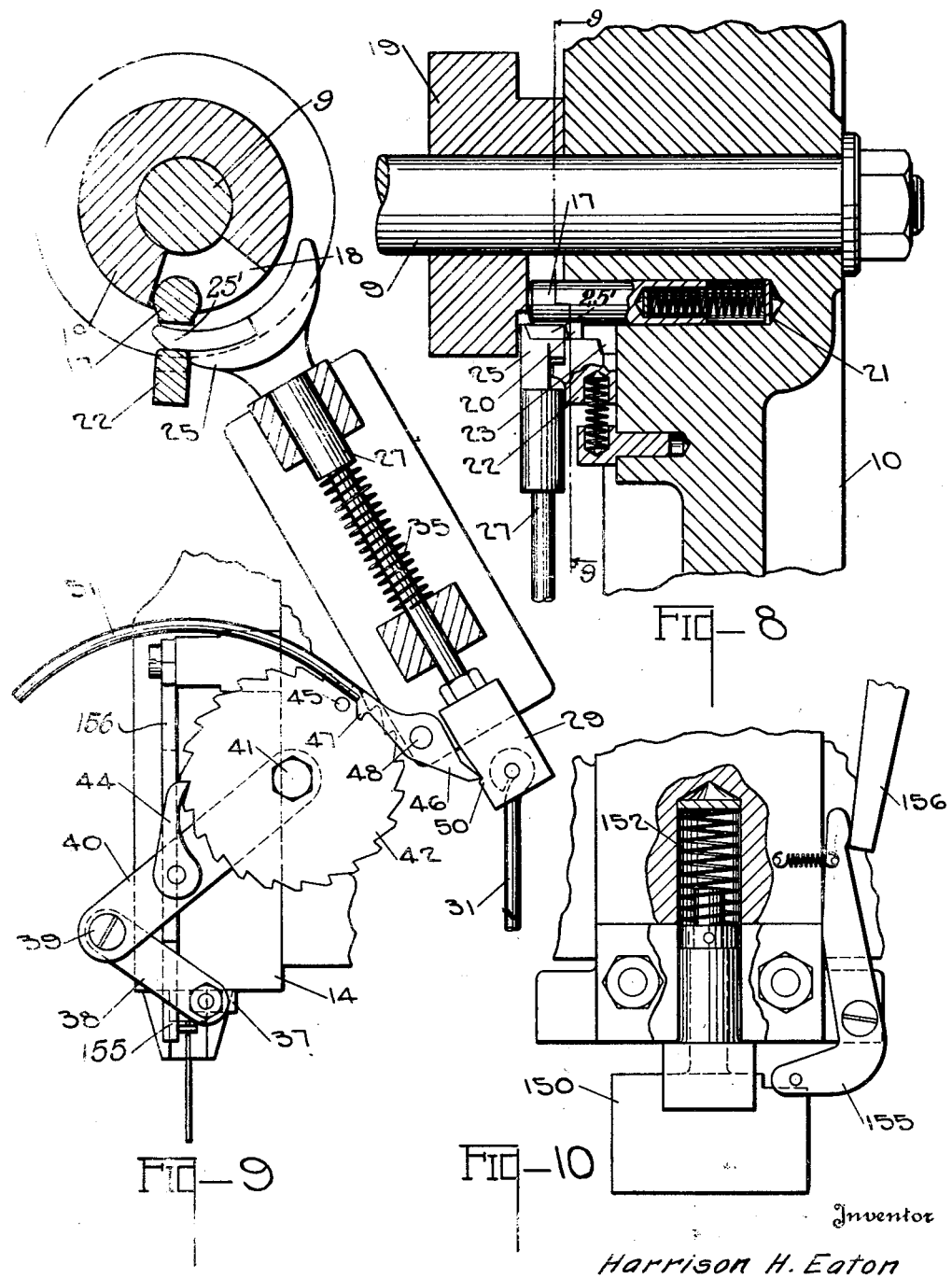

Patented Nov. 13, 1934

1,980,170

UNITED STATES PATENT OFFICE 1,980,170

INSULATION PROCESS AND MACHINE

Harrison H. Eaton, Toledo, Ohio, assignor to The Electric Auto-Lite Company, Toledo, Ohio, a corporation of Ohio Application October 22, 1928, Serial No. 314,306

13 Claims. (Cl. 29—84)

This invention relates to an apparatus and method for forming and locating insulating material in the slots of a core which are adapted to receive energizing coils. In the type of core with which the present invention is concerned, the core is preferably formed of a series of laminations, and provided with longitudinal grooves or slots which receive energizing coils. Before inserting the coils into the slots, an insulating layer or lining is required in each slot to prevent engagement of the coils with the walls of the core slots. Heretofore it has been the practice to provide insulating linings in the form of small pieces or strips of paper which were previously cut to proper lengths, formed, and subsequently inserted in the armature slots by manual operation. As the pieces of paper were usually stored after being cut and formed or creased, the edges of the papers were liable to become frayed or torn from constant handling before they were inserted in the core slots.

It is one of the objects of this invention to provide an apparatus and method for rapidly and continuously forming and inserting strips of insulating material in the slots of a core.

Another object of the invention is the provision of a machine which automatically inserts a portion of a continuous supply of material in a core slot.

Another object is the provision of means for automatically indexing or shifting the core after the insertion of an insulating strip to bring the next succeeding core recess or slot into proper position to receive a strip of material.

A further object is to provide a machine which will be automatically stopped after all the recesses of a core have been lined with insulating material. The invention also embraces a means for automatically stopping the machine in event that the core is not properly positioned for inserting lining in the core recess.

Still another object is the provision of an automatic machine of this character which is simple and positive in its operation, not liable to get out of order, and which is capable of being operated by unskilled workmen.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which—

Figure 3 is a vertical transverse sectional view through the machine showing the core indexing and insulating strip shearing means;

Figure 4 is a horizontal sectional plan view taken substantially on the line 4—4 of Figure 1;

Figure 5 is an enlarged fragmentary detail view showing the relative position of various parts before the insulating strip has been inserted in the armature;

Figure 6 is a view similar to Figure 5 showing the relative position of the parts during the strip inserting operation;

Figure 7 is an enlarged detailed sectional view of an overrunning clutch taken substantially on the line 7—7 of Figure 4;

Figure 8 is a vertical transverse sectional view showing the main clutch and operating means therefor;

Figure 9 is a sectional view taken substantially on the line 9—9 of Figure 8 showing the main clutch mechanism with certain parts in section showing the means for automatically stopping the machine under predetermined conditions;

Figure 10 is a fragmentary detail view of certain parts of the machine.

Figure 1:
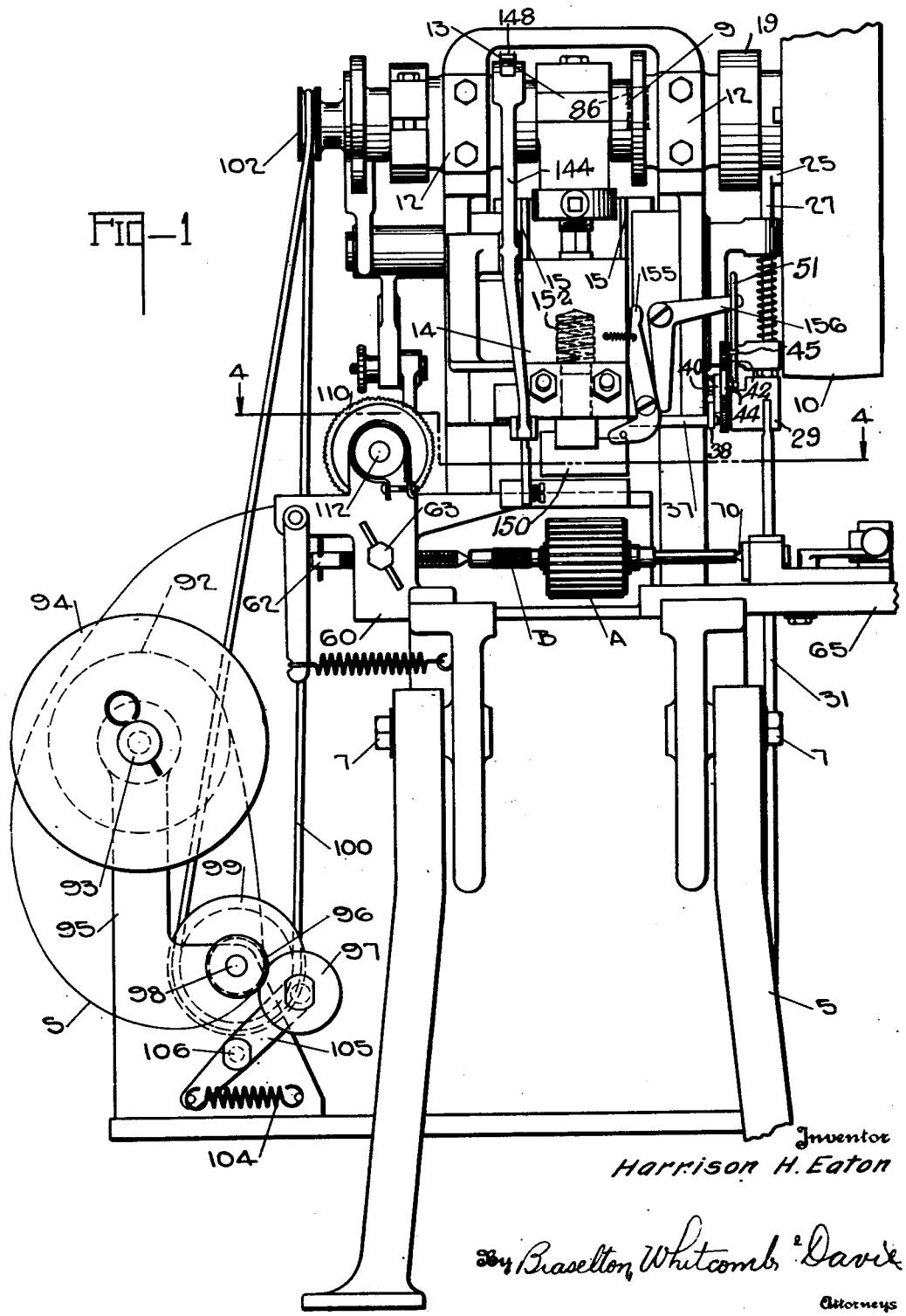
Figure 1 is a front elevational view of the machine of my invention showing a grooved core in position to receive insulating material.
Figure 2:
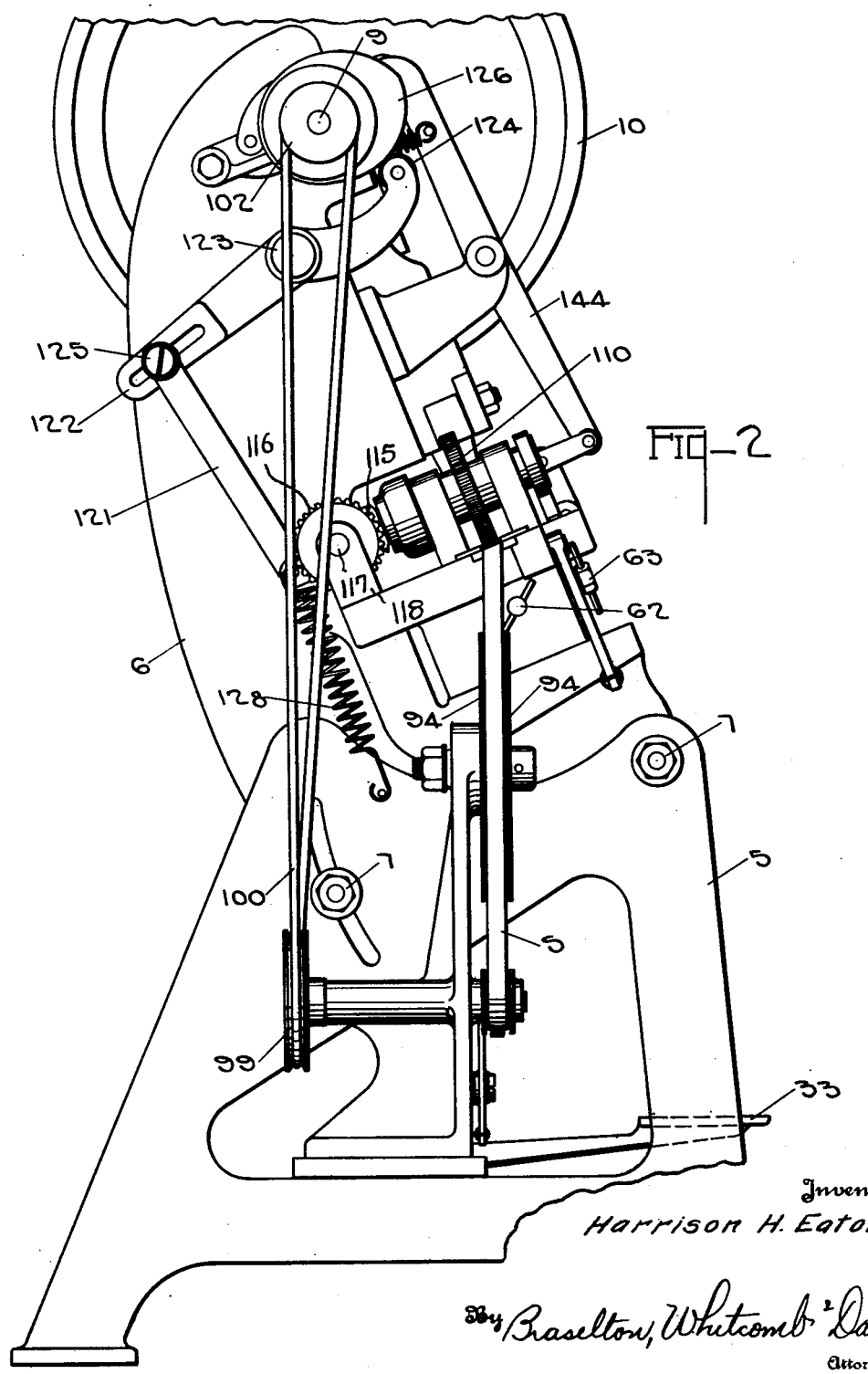
Figure 2 is a side elevational view of the machine shown in Figure 1.

I have illustrated the machine of my invention as used for lining the slots or recesses of armature cores with insulating material, but it is to be understood that I do not wish to limit the construction or use of my device to the disclosure shown in the drawings and that I contemplate the use of the device wherever the same may be found applicable.

The machine of my invention comprises a base portion 5, the upper part of which is formed with a pair of grooved ways (not shown) adapted to support an L-shaped frame 6. The frame 6 of the machine may be tilted with respect to the base portion 5 and held in adjusted position by means of lock nuts 7. Journalled in the upper part of the frame 6 is a crank shaft 9 which carries at one end a flywheel 10 normally adapted for rotation independent of the crank shaft 9, the flywheel being connected by means of a belt (not shown) to a suitable source of power. Journalled upon the crank arm and located intermediate the crank shaft supporting bearings 12, is a pitman 13 which is pivotally connected at its lower end to a ram 14, the latter being adapted for vertical reciprocation between guide ways 15.

Clutch operating mechanism

In order to operatively connect the flywheel 10 with the crank shaft 9, I have provided a clutch mechanism of the usual type as shown in detail in Figures 8 and 9 consisting of a pin 17 slidably carried in a bore in the flywheel 10 and adapted to engage or project into a notch 18 in a flange 19, the latter being fixedly secured to the crank shaft. The pin 17 is provided with a projection 20 and is normally held out of engagement with the crank shaft by means of a spring actuated latch 22, which is formed with a notch 23 adapted to accommodate the projection 20 on the pin 17 and restrain the pin from engagement with the crank shaft.

The releasing means comprises a cam 25 formed upon the upper end of a rod 27 and connected at its lower end to a block 29, a link 31 connecting the block 29 to an operating treadle 33. The cam 25 is resiliently held in its uppermost position by means of a coil spring 35 in which position it is out of engagement with the latch 22. By depressing the treadle 33, the cam 25 will be moved into the path of the latch 22 carried by the flywheel 10, and the face of the cam is so shaped as to cause a movement of the latch radially of the flywheel and release the clutch pin 17 which is forced into the notch 18 in the crank shaft flange 19 under the influence of a coil spring 21. By this means the crank shaft 9 is caused to rotate with the flywheel 10, and through the medium of the pitman 13, causes a reciprocation of ram 14.

I have provided automatic means for disengaging the pin 17 from the notch in the crank shaft 9 which means is caused to operate after a certain predetermined number of reciprocations of the ram 14. Fixed to the ram is a transversely extending rod 37 to the extremity of which is pivotally connected a link 38, the other end of the link in turn being pivotally connected by means of a screw 39 to the one end of a link 40, the latter having its upper extremity pivoted upon a screw 41 forming the axis and supporting means for a ratchet wheel 42. The link 40 is provided intermediate its ends with a pawl 44 which is adapted to successively engage the teeth of the wheel 42 with each vertical reciprocation of the ram 14.

The ratchet wheel 42 is also provided with a pin 45 which is adapted, upon each complete revolution of the wheel, to engage one end of a pawl 46 suitably pivoted upon a stud 48 fixed in the frame of the machine. The block 29, forming a part of the clutch operating mechanism, is formed with a tooth 50 which is adapted, when the block 29 has been withdrawn to its lowermost position by means of the treadle 33, to be engaged by the pawl 46, the latter being constantly urged into contact with block 29 by means of the extended arm 51.

It will be apparent that upon depression of the treadle 33, the pawl 46 will engage the tooth 50 on the block 29 and prevent immediate disengagement of the clutch mechanism, the parts being in the position shown in Figure 9. Each reciprocatory movement of ram 14 causes the pawl 44 to successively engage the teeth of the wheel 42 thus intermittently rotating the latter in a clockwise direction until the pin 45 engages a projection 47 on the pawl 46 to withdraw the latter from engagement with the block 29 thus disengaging the clutch mechanism, and by permitting upward movement of cam 25 bring tapered cam face 25' into engagement with the end of pin 17 causing the pin 17 to be moved until projection 20 of pin 17 is engaged by notch 23 in latch 22.

The ratchet wheel 42 is preferably provided with as many teeth as there are slots in the armature core so that upon completion of the insulation inserting operations, the mechanism will be automatically stopped. If the operator should desire to stop the reciprocation of the ram 14, it is only necessary for him to manually elevate the arm 51 and disengage pawl 42 from the block 29.

Armature core supporting and indexing mechanism

Secured to the body portion 6 of the machine is a bracket or shelf-like member 60 having a horizontal threaded opening which receives a threaded member 62 having a cone pointed extremity adapted for engagement with a recess in the center of one end of the shaft B of the armature core A as shown in Figures 1 and 4. Obviously, the member 62 may be adjusted to vary the relative position of the core A and the member 62 may be locked in its adjusted position by means of a screw 63. A table portion 65 also secured to the machine is provided with a pair of transversely extending ways 67 which are adapted to slidably support and guide a member 69 carrying a cone pointed member 70 adapted to engage the other end of the core shaft B. The core is thus supported between the members 62 and 70. I have provided means for rapidly withdrawing the member 70 from engagement with the armature core shaft which means comprises a link 72 pivoted as at 73 to an extension of the block 69, the other end of the link being pivoted at 74 to one arm of a bell crank lever 75 pivoted as at 76 to a bracket 77 carried by the table 65. The lever 75 is provided with a handle portion 79 and it is apparent that a movement of the handle in a right hand direction will, through the medium of the link 72, operate to withdraw the member 70 from engagement with the core shaft B so that the armature core A may be easily and rapidly removed from the machine and a new one substituted therefor.

After each succeeding length of insulating material has been inserted in a slot of the armature core in a manner to be hereinafter fully described, the armature must be moved to a position bringing the next succeeding armature slot into a position to receive the strip of material. As shown in Figure 3, I have provided an indexing mechanism comprising a pawl 82 which is pivotally carried by the lower end of a lever 83 the latter being pivoted intermediate its ends to the frame of the machine as at 84, the upper extremity thereof being provided with a cam follower or roller 86 adapted for engagement with the curved surface of a cam 87 carried by the crank shaft 9. The roller 86 is at all times urged into contact with the cam 87 by means of a retractile spring 88.

In the operation of this mechanism, with each reciprocation of the ram 14, i. e. for every complete revolution of the crank shaft 9, the cam 87 is of such contour as to cause the pawl 82 to engage one wall of the next succeeding slot in the armature core and rotate the same to bring the next slot thereof into position to receive a strip of insulating material.

Insulating material feeding and severing means

The insulating material which is particularly adapted for use with my machine is in the form of a narrow strip which may be purchased in roll form 92 which is supported upon an arbor 93 carried in the upper extremity of a bracket 95, the displacement of the strip being prevented by means of a pair of flat disks 94. The strip of material S is passed between feed rolls 96 and 97, the roll 96 being the live roll which is supported upon a shaft 98, the latter being provided with a grooved wheel 99, adapted to be driven by a belt 100 passing over a similarly grooved wheel 102 secured to one end of the crank shaft 9. The roll 97 is held in frictional engagement against the strip S by means of a retractile spring 104 connected to one end of an arm 105 pivoted to the bracket 95 as at 106, the arm supporting the roller 97. It will be apparent from the foregoing description that with each complete revolution of the crank shaft 9 the strip of material S is advanced through a predetermined distance.

The main strip feeding means comprises a roller 110 having a corrugated or knurled periphery which is adapted for engagement with the strip S as it is taken from the feeding rolls 96 and 97. The shaft 112 carrying the feed roll 110 is connected through the medium of an overrunning clutch mechanism 114, the latter particularly shown in detail in Figure 7, to a miter gear 115 enmeshed with a similar and larger gear 116 carried upon a transversely extending shaft 117 journalled in bearings 118 forming part of the bracket 60. Secured to the shaft 117 is an arm 120 which is connected by means of a link 121 to one extremity of a lever 122 pivoted as at 123 to the frame of the machine. The other arm of the lever 122 carries a roller 124 adapted for engagement with the irregular surface of a cam 126 also carried upon the crank shaft 9. The roller 124 is constantly urged into engagement with the cam 126 by means of a coil spring 128. It will be apparent that with each revolution of the crank shaft 9 the lobe or raised portion of the cam 126 will oscillate the lever 122 causing a similar movement of the arm 120 and shaft 117 which movement is transmitted through the gears 115 and 116 and overrunning clutch 114 to the feed roll 110 and imparts a predetermined movement to the latter in order to advance the strip S through a predetermined distance. In order to vary the length of strip advanced by the feed roll 110 it is only necessary to adjust the end of the link 121 in engagement with the slotted end of the lever 122 which adjustment may be accomplished by manipulation of a screw 125 so as to vary the effective length of the arm of the lever 122 connected to the link 121.

The strip S is conveyed through guiding ways 135 to a position immediately above the armature core A, the table 136 supporting the ways 135 being provided with a narrow slot 138 with which the slots of the armature are adapted to successively register as shown in Figures 5 and 6.

With each revolution of the crank shaft 9, the portion of the strip S in alignment with the core A is sheared from the supply by means which will now be described. Pivoted to the table portion 136 as at 140 is an L shaped shearing blade or knife 141 which is connected by means of a link 143 to the lower end of a lever 144 pivoted intermediate its ends as at 145 to the frame of the machine, the upper end of the lever carrying a roller 147 adapted for engagement with the cam surface 148 also carried by the crank shaft 9. The contour of the cam 148 is such that with each revolution of the crank shaft the shearing blade 141 is oscillated in a downward direction and operates to sever or cut off a portion of the strip S of the insulating material. The ram 14 is provided with a plunger 150 which is adapted upon a downward movement of the ram caused by rotation of the crank shaft 9 to engage the severed portion of the strip S located between the guide ways 135 and move the same downwardly through the slot 138 bending the strip S and inserting same into a slot in the core A in a manner particularly shown in Figure 6 of the drawings. Interposed between the plunger 150 and the ram 14 is a coiled spring 152 so that in the event that the plunger 150 should engage the peripheral surface of the armature core due to an inaccurate alignment of an armature slot with the opening 138, the spring 152 will be compressed and allow further downward movement of the ram 14 thus offsetting any danger of injuring the armature. Furthermore, should the plunger 150 inadvertently engage the surface of the armature and compress the spring 152 the movement of the plunger 150 relative to the movement of the ram 14 causes an oscillation of a bell crank lever 155 which actuates a second bell crank lever 156 bringing one arm of the latter into contact with the extension 51 of the clutch operating pawl 46 and disengaging the clutch mechanism from the crank shaft 9 thereby stopping the machine.

It is apparent that, within the scope of the invention modifications and different arrangements may be made other than is herein disclosed, and the present disclosure is illustrative merely, the invention comprehending all variations thereof.

What I claim is:

1. A method of lining the slots of armature cores with insulation which consists in bringing a strip of material into parallelism with the axis of the core and shearing a portion of said strip, forming said severed portion to a predetermined configuration and subsequently placing said severed and formed portion into one of the armature slots.

2. A method of lining armature core slots with insulation which consists in bringing a continuous strip of material into parallelism with the axis of the core, severing a portion of said strip, forming said severed portion to a predetermined configuration and subsequently inserting the severed and formed portion into one of the armature slots.

3. A method of lining armature core slots with insulation which consists in bringing a continuous strip of material into parallelism with the axis of the armature core and successively severing and forming portions of said strip into predetermined configurations and progressively inserting said severed and formed portions in the slots of the armature.

4. In an apparatus for lining core slots with a strip of insulating material; the combination of means for supporting an armature core; means for severing a length of insulating material from a supply and means for forming said severed length to a predetermined configuration and placing said length of material in one of the core slots adjacent the walls thereof.

5. In an apparatus for lining the slots of a core with insulating material, the combination of a means for supporting a core; means for bringing a strip of insulating material into parallelism with the core recesses; means for inserting portions of said strip in the core recesses; and means for indexing the core acting against the walls of said recesses.

6. In an apparatus for lining armature core slots with insulating material; automatic means for intermittently advancing the insulating material; and means for periodically severing portions of the material from a supply thereof; means for bending said severed portions; and means for inserting said severed portions in the armature core slots.

7. In a machine for lining armature core recesses with insulating material, a means for supporting an armature; means for placing a length of the material in one of the core recesses including a yieldably mounted member; and means cooperating with said member for stopping the machine under predetermined conditions.

8. In a machine for lining armature core recesses with insulating material, the combination of means for supporting a core; a movable member; an insulation inserting member connected to said movable member, said insulation inserting member being capable of movement relative to said movable member under predetermined conditions; and means set into operation by the relative movement of said insulation inserting member for automatically stopping the machine.

9. In a machine for lining armature core slots with fibrous material; means for bending a strip of fibrous material; means for guiding said strip to said bending means and means for inserting said bent strip into a core slot independently of the remaining slots and means for indexing the core acting against the walls of the core slots for changing the position of the core with respect to the strip inserting means.

10. In a machine for lining armature core slots with fibrous material; means for feeding a continuous strip of the material; means for severing portions from the continuous strip; and means for forming to a predetermined configuration and inserting the severed portions in the core slots.

11. In combination, means for movably supporting a core structure having spaced recesses; means for bringing a strip of insulating material adjacent to the core recesses; means for forming said strip to a predetermined configuration; means for placing said formed strip in one of the core recesses adjacent the walls thereof; and means for indexing the core acting against the wall of said recess.

12. A method of lining the slots of armature cores with insulation which consists in bringing a strip of insulating material into juxtaposition with the core and subsequently forming to a predetermined configuration and inserting said formed strip into one of the armature slots whereby the adjacent walls of the latter are covered by the insulating material.

13. A method of lining armature core slots with insulation which consists of bringing a continuous strip of material, whose transverse dimension is substantially equal to the peripheral dimension of one of the armature slots, into parallelism with the axis of the core; of severing a portion of said strip from the supply and forming said severed portion to a predetermined configuration and subsequently inserting the severed and formed portion into one of the armature slots.

HARRISON H. EATON.